United States Patent Office 3,482,632
Patented Dec. 9, 1969

3,482,632
MISCIBLE FLOODING PROCESS USING IMPROVED SOLUBLE OIL COMPOSITIONS
LeRoy W. Holm, Fullerton, Calif., assignor to Union Oil Company of California, Los Angeles, Calif., a corporation of California
No Drawing. Filed Mar. 15, 1968, Ser. No. 713,303
Int. Cl. E21b 43/22
U.S. Cl. 166—273
19 Claims

ABSTRACT OF THE DISCLOSURE

A miscible flooding process for the recovery of oil from subterranean reservoirs in which an improved soluble oil composition comprising a mixture of liquid hydrocarbon, a surface active agent and butyl Cellosolve is injected into the reservoir through an injection well, and thereafter an aqueous flooding agent is injected to drive the soluble oil composition towards a spaced production well. The soluble oil composition can be injected into the reservoir as a substantially anhydrous liquid or as a water-in-oil microemulsion.

---

This invention relates to the recovery of oil from subterranean petroleum reservoirs, and more particularly to an improved miscible flooding process for the recovery of petroleum.

It has long been recognized that substantial amounts of oil remain unrecovered at the completion of normal primary recovery operations. Hence, various secondary methods of recovering additional quantities of oil having been proposed, such as the well-known technique of water flooding in which water is injected into the reservoir through an injection well to drive additional oil toward one or more production wells spaced apart in the reservoir from the injection well. Although an additional quantity of oil can often be recovered by water flooding, the efficiency of the water flood and the ultimate oil recovery can be further improved by introducing a solvent that is miscible with both the connate oil and with the flood water into the reservoir ahead of the flood water.

One particular solvent system that has been suggested for use with a water drive comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and small droplets of water are dispersed therein.

While the foregoing anhydrous soluble oils and microemulsions are effective in recovering more oil than recovered by conventional water flooding, it is nevertheless desirable to even further improve the miscible flooding process to reduce its cost and to recover additional amounts of oil.

Accordingly, a principal object of this invention is to provide an improved miscible flooding process for the recovery of petroleum from subterranean reservoirs. Another object of the invention is to provide a miscible flooding process in which an improved miscible displacement fluid is injected into an oil-containing reservoir and thereafter driven through the reservoir by flood water. A further object of the invention is to provide a miscible flooding process employing an improved soluble oil composition as the miscible displacement fluid. A still further object of the invention is to provide a miscible flooding process utilizing an improved water-in-oil microemulsion as the miscible displacement fluid. Other objects and advantages of the invention will be apparent from the following description.

Briefly, this invention contemplates a process for recovering oil from subterranean reservoirs in which an improved soluble oil composition comprising a mixture of liquid hydrocarbon, a surface active agent and butyl Cellosolve is injected into the reservoir through an injection well, and thereafter an aqueous flooding agent is injected to drive the miscible displacement fluid towards a production well spaced apart in the reservoir from the injection well. The soluble oil can be injected into the reservoir as an anhydrous liquid, or it can be injected as a water-in-oil microemulsion.

More specifically, this invention involves a miscible flooding process in which oil is displaced from a subterranean oil-bearing reservoir by an improved soluble oil composition containing a minor proportion of butyl Cellosolve. In the practice of the invention, a slug of the improved soluble oil composition in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the miscible flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils comprise a liquid hydrocarbon, one or more selected surface active agents, and a minor proportion of butyl Cellosolve. The emulsions formed by the addition of water to a soluble oil are of the water-in-oil type in that at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely affecting the utility of the microemulsions as a miscible displacement agent. Emulsions of this type are designated microemulsions to distinguish them from ordinary water-in-oil macroemulsions in which the lower limit of particle size of the water droplets is about 0.1 micron. At water concentrations above the inversion concentration, the emulsion inverts to an emulsion of the water-in-oil type in which droplets of oil are dispersed in a continuous water phase. It is preferred that the water concentrations of the microemulsion of this invention be maintained below the inversion concentration so as to prevent inversion to emulsions of the oil-in-water type.

One of the major constituents of the improved soluble oil composition of this invention is a liquid hydrocarbon, which can comprise a crude petroleum oil, such as a crude oil previously recovered from the reservoir, or other conveniently available crude oil; a refined or semi-refined petroleum product, such as gasoline, naphtha, stove oil and diesel; a residual product obtained by the distillation of lower boiling fractions from a crude oil, such as bunker fuel oil and other residual products; a low value refinery by-product, such as catalytic cycle oil, lube oil extract, and the like; and liquefied normally gaseous hydrocarbons such as propane, butane and LPG.

While soluble oils can be prepared from any of these hydrocarbon materials, or mixtures of hydrocarbons, it has ben found that oil recoveries are especially increased by miscible flooding with a soluble oil or microemulsion compounded with crude petroleum oil, or other hydrocarbon mixture containing relatively high-boiling hydrocarbon constituents, and butyl Cellosolve. By relatively high-boiling hydrocarbons is meant those boiling at least above about 400° F., and more preferably above about 600° F. The hydrocarbon base stock can contain low-boiling hydrocarbons boiling below about 400° F. without adversely affecting oil recovery, so long as a substantial portion of the base stock is comprised of the high-boiling components. For example, excellent displacement efficiencies are obtained with soluble oils compounded from crude petroleum, even though the crude petroleum contains some fractions boiling as low as 100° F. Thus, the miscible displacement fluids preferred for use in the practice of this invention comprise mixtures of crude petroleum or other hydrocarbon mixtures containing relatively high-boiling hydrocarbon constituents, a surface active agent, and butyl Cellosolve.

Surface active materials which can be used are those that when admixed with the hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, oil-loving, or non-polar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce waterin-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

Butyl Cellosolve is a colorless liquid solvent, miscible both with water and with oil, and is chemically designated glycol monobutyl ether or 2-butoxyethanol. When included in a minor proportion in the soluble oil compositions of this invention, butyl Cellosolve functions as a stabilizing agent rendering the surface active component of the soluble oil more effective and improving the stability of the resulting microemulsion. Further, it has been discovered that miscible flooding with soluble oils and microemulsions containing a minor proportion of butyl Cellosolve results in the recovery of increased quantities of oil. While the exact mechanism by which the increased recovery is effected is not understood, it has nevertheless been demonstrated that miscible flooding with soluble oils and microemulsions containing butyl Cellosolve is more efficient than flooding with similar soluble oils and microemulsions containing other stabilizing agents, such as isopropyl alcohol, particularly where the soluble oil or microemulsion is compounded with a hydrocarbon containing relatively high-boiling constituents.

A preferred composition in accordance with this invention useful as a miscible displacement fluid comprises a mixture of about 45 to 75 percent liquid hydrocarbon, such as crude petroleum or other high boiling hydrocarbon; 8 to 30 percent of a surface active material, such as an alkyl aryl monosulfonate obtained by sulfonation of an aromatic petroleum fraction; 3 to 8 percent butyl Cellosolve; and 0 to 40 percent water. Also, where the hydrocarbon liquid has a relatively high viscosity, light liquid hydrocarbon can be added to increase the mobility of the resulting soluble oil to obtain a more favorable mobility ratio between the soluble oil and the following drive fluid. The light hydrocarbon will usually not constitute more than 25 volume percent of the resulting soluble oil.

The compostiions useful in the practice of this invention can be prepared by any of the conventional techniques. One suitable method of preparing these compositions is to first admix the hydrocarbon base stock, surface active material and butyl Cellosolve in the desired proportions to form a substantially anhydrous soluble oil. Thereafter, if desired, water is added to obtain a microemulsion of the desired water content. Preferably, the water employed in forming the microemulsion is a salt-containing fresh water having a dissolved salt content of less than about 5000 p.p.m.

The quantity of soluble oil or microemulsion injected should be sufficient to establish in the reservoir a miscible bank which can be displaced through the reservoir by the subsequently injected aqueous flooding medium. Satisfactory recoveries can usually be obtained by the injection of 0.01 to 0.15 reservoir pore volume of the soluble oil or microemulsion.

In one preferred embodiment of this invention, a hydrocarbon, such as previously recovered reservoir oil; a mixed alkyl aryl monosulfonate obtained by sulfonation of an aromatic petroleum fraction; and butyl Cellosolve are admixed to obtain a substantially anhydrous soluble oil comprised of 45 to 75 percent hydrocarbon, 8 to 30 percent surface active agent and 3 to 8 perceint butyl Cellosolve. This anhydrous soluble oil can be used as the miscible displacement agent or water can be added to the soluble oil to obtain a water-in-oil microemulsion containing up to about 40 percent water.

The soluble oil prepared in the forgoing manner is then injected into the reservoir through one or more injections wells in an amount equivalent to 0.01 to 0.15 reservoir pore volume of the reservoir to be treated. Aqueous flooding medium is then injected to displace the soluble oil toward at least one production well spaced apart in the reservoir, from which fluids are produced in conventional manner. The aqueous flooding medium can comprise water or brine, and can be made more viscous by the addition of a thickening agent, such as sugar, dextran, carboxymethyl cellulose, amines, glycerine, guar gum and mixtures of these agents. Also, the aqueous flooding medium can be rendered more viscous by the addition of a small amount of a water-soluble polymer, such as a polyacrylamide, and particularly a partially hydrolyzed polyacrylamide.

In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.5 reservoir pore volume of thickened aqueous flooding medium. Thereafter water or brine is injected to drive the previously injected fluids toward at least one spaced production well.

The invention is further described by the following examples which are illustrative of specific modes of practicing the invention and are not intended as limiting the scope of the invention as defined by the appended claims.

EXAMPLE 1

The increased oil recovery obtainable by miscible flooding with a soluble oil having a composition in accordance with this invention is demonstrated by the following laboratory tests. Two substantially identical test cores 2 feet long by 1½ inches in diameter are prepared by packing Lucite tubes with Nevada 130 sand. The cores are first saturated with water and then with an Illinois crude oil having a gravity of 39° API. Final oil saturation is about 80%.

A miscible displacement fluid is prepared by admixing 72 percent of the Illinois crude, 6.7 percent isopropyl alcohol, and 21.3 percent of a mixed alkyl aryl petroleum monosulfonate marketed by the Sonneborne Division of Witco Chemical Company, Inc. under the trademark Petronate CR. Petronate CR is an oil solution containing about 62 percent of alkyl aryl sodium sulfonates having a molecular weight in the range of 490 to 510 and about 5 percent water. The first test is conducted by flooding one of the cores with 0.10 pore volume of the anhydrous soluble oil. The soluble oil is driven through the core with an aqueous flooding medium thickened by the addition of 0.06 weight percent of a partially hydrolyzed polyacrylamide marketed by the Dow Chemical Company under the trademark Pusher 500. The recovered oil is accumulated and the voume of oil recovered is measured. The ultimate oil recovery after the injection of 1.3 pore volumes of aqueous flooding medium is 87 percent of the original oil-in-place exclusive of the amount of soluble oil injected.

The foregoing test is repeated on the second core using 0.10 pore volume of a soluble oil in accordance with this invention prepared by admixing 72 percent Illinois crude, 21.3 percent Petronate CR and 6.7 percent butyl Cellosolve. The ultimate oil recovery after the injection of 1.3 pore volumes of aqueous flooding medium is 91.8 percent of the original oil-in-place exclusive of the amount of soluble oil injected.

EXAMPLE 2

A number of substantially identical test cores 6 feet long by 1½ inches in diameter are prepared by packing Lucite tubes with Nevada 130 sand. The cores are first saturated with water and then with an Illinois crude oil having a gravity of 39° API.

Several microemulsions are prepared by admixing Illinois crude oil or gasoline, butyl Cellosolve or isopropyl alcohol, and alkyl aryl petroleum sulfonates marketed by the Sonneborn Division of Witco Chemical Company, Inc., under the trademarks Petronate HL and Petronate CR to form an anhydrous soluble oil. Petronate CR is described in Example 1 and Petronate HL is an oil solution containing about 52 percent of alkyl aryl sodium sulfonates having a molecular weight in the range of 440 to 470 and about 3.5 percent water. The microemulsion is then produced by adding a desired quantity of tap water containing about 700 p.p.m. dissolved salts to the soluble oil.

The cores are flooded with brine until they become watered-out to simulate a conventional water flood. Residual oil saturations are 24–30 percent. Then 0.025 pore volume of a microemulsion is injected into and driven through the core with 0.40 pore volume of an aqueous 0.2 weight percent solution of partially hydrolyzed polyacrylamide marketed by the Dow Chemical Company under the trademark Pusher 500, and then with an aqueous brine solution. The recovered oil is accumulated and the volume of oil recovered is measured. The results of these tests are summarized in Table 1. It is apparent from these data that while butyl Cellosolve effects some improvement in oil recovery in a soluble oil system compounded with gasoline, an unexpectedly large increase in oil recovery is experienced in a soluble oil system compounded with petroleum crude oil.

TABLE 1

| Run | Microemulsion Composition, Vol. percent | | | | Residual Oil Saturation after Initial Flood, Percent | Ultimate Oil Recovery, Percent |
|---|---|---|---|---|---|---|
| | Hydrocarbon | Stabliizing Agent | Surfactant | Water | | |
| 1 | [1] 48.6 | [2] 6.1 | [3] 12.9 | 32.4 | 24.6 | 71.5 |
| 2 | [1] 48.6 | [4] 6.1 | [3] 12.9 | 32.4 | 26.3 | 73.6 |
| 3 | [5] 69.2 | [2] 6.4 | [6] 20.4 | 4 | 28.2 | 29.6 |
| 4 | [5] 69.2 | [4] 6.4 | [6] 20.4 | 4 | 29.3 | 83.8 |

[1] Gasoline.
[2] Isopropyl alcohol.
[3] Petronate HL.
[4] Butyl Cellosolve.
[5] Crude oil.
[6] Petronate CR.

EXAMPLE 3

A miscible flooding operation is conducted on an oil-containing reservoir in accordance with the method of this invention. Four injection wells are arranged in a rectangular pattern around a single centrally located production well. A miscible displacement fluid comprising a microemulsion is prepared by admixing 69.2 percent previously recovered petroleum crude oil, 6.4 percent butyl Cellosolve, 20.4 percent Petronate CR and 4.0 percent fresh water containing about 900 p.p.m. dissolved salts. The microemulsion is injected into each of the injection wells at injection rates of 30–40 barrels per day until a total amount of microemulsion equivalent to about 0.05 pore volume is injected. Thereafter, aqueous flooding medium is injected into the reservoir through each of the injection wells and petroleum and other produced fluids are recovered from the central producing well.

Various embodiments and modifications of this invention have been described in the foregoing description and examples, and further modification will be apparent to those skilled in the art. Such modifications are included within the scope of this invention as defined by the following claims.

Having now described the invention, I claim:

1. In the method of recovering petroleum from a subterranean reservoir in which a miscible displacement fluid miscible with both the connate reservoir oil and with water is injected into the reservoir through an injection well, and thereafter an aqueous flooding medium is injected to drive the miscible displacement fluid towards a spaced production well from which fluids are recovered, the improvement which comprises employing as the miscible displacement fluid a soluble oil comprising liquid hydrocarbon, a surface active agent and butyl Cellosolve.

2. The method defined in claim 1 wherein said liquid hydrocarbon is crude petroleum.

3. The method defined in claim 2 wherein said crude petroleum is previously recovered from said reservoir.

4. The method defined in claim 2 wherein said miscible displacement fluid also contains an additional quantity of light liquid hydrocarbon to increase the mobility of the miscible displacement fluid to obtain a more favorable mobility ratio between the soluble oil and the following aqueous flooding medium.

5. The method defined in claim 1 wherein said soluble oil contains water present in the form of a water-in-oil microemulsion.

6. The method defined in claim 1 wherein between about 0.01 to 0.15 reservoir pore volumes of said miscible displacement fluid is injected into the reservoir.

7. The method defined in claim 1 wherein at least an initial portion of said aqueous medium is increased in viscosity by the addition of a thickening agent.

8. The method defined in claim 1 wherein said miscible displacement fluid is comprised of from 45 to 75 volume percent liquid hydrocarbon, 8 to 30 volume percent surface active agent, and 3 to 8 volume percent butyl Cellosolve.

9. The method defined in claim 1 wherein said surface active agent is an alkyl aryl sulfonate.

10. The method defined in claim 1 wherein said miscible displacement fluid is comprised of from about 45 to 75 volume percent liquid hydrocarbon, 8 to 30 volume percent alkyl aryl sulfonate, and a minor proportion of butyl Cellosolve.

11. A method for recovering petroleum from a subterranean reservoir penetrated by an injection well and a production well spaced apart in the reservoir, which comprises:

injecting 0.01 to 0.15 reservoir pore volume of a soluble oil comprising a mixture of about 45 to 75 volume percent liquid hydrocarbon, 8 to 30 volume percent surface active agent, a minor portion of butyl Cellosolve, and 0 to 40 percent water, said water being present in the form of a water-in-oil microemulsion;

thereafter injecting an aqueous flooding medium to drive the soluble oil towards said production well; and recovering petroleum from said production well.

12. The method defined in claim 11 wherein said liquid hydrocarbon is petroleum crude oil.

13. The method defined in claim 12 wherein an additional quantity of light liquid hydrocarbon is added to the soluble oil to increase its mobility to obtain a more favorable mobility ratio between the soluble oil and the following aqueous flooding medium.

14. The method defined in claim 11 in which an initial portion of the aqueous flooding medium is increased in viscosity by the addition of a thickening agent.

15. The method defined in claim 11 wherein said soluble oil contains about 3 to 8 volume percent butyl Cellosolve.

16. The method defined in claim 11 wherein said surface active agent is alkyl aryl sulfonate.

17. A method for recovering petroleum from a subterranean reservoir penetrated by an injection well and a production well spaced apart in the reservoir, which comprises:

injecting 0.01 to 0.15 reservoir pore volume of a soluble oil comprising a mixture of 45 to 75 volume percent petroleum crude oil, 8 to 30 volume percent alkyl aryl sulfonate, a minor proportion of butyl Cellosolve, and 0 to 40 percent water, said water being present in the form of a water-in-oil microemulsion;

next injecting 0.1 to 0.5 reservoir pore volume of an aqueous flooding medium thickened by the addition of a minor proportion of a water-soluble polymer;

thereafter injecting a flood water to displace said previously injected fluids towards said production well; and recovering petroleum from said production well.

18. The method defined in claim 17 in which an additional quantity of light liquid hydrocarbon is added to the soluble oil to increase its mobility to obtain a more favorable mobility ratio between the soluble oil and the following aqueous flooding medium.

19. The method defined in claim 17 wherein said solube oil contains about 3 to 8 volume percent butyl Cellosolve.

References Cited

UNITED STATES PATENTS

| | | | |
|---|---|---|---|
| 2,742,089 | 4/1956 | Morse et al. | 166—9 |
| 3,175,609 | 3/1965 | Csaszar | 166—9 |
| 3,254,714 | 6/1966 | Gogarty et al. | 166—9 |
| 3,261,399 | 7/1966 | Coppel | 166—9 |
| 3,275,075 | 9/1966 | Gogarty et al. | 166—9 |
| 3,292,696 | 12/1966 | Sandiford | 166—9 |
| 3,307,628 | 3/1967 | Sena | 166—9 |
| 3,324,944 | 6/1967 | Poettmann | 166—9 |
| 3,356,138 | 12/1967 | Davis et al. | 166—9 |
| 3,406,754 | 10/1968 | Gogarty | 166—9 |

STEPHEN NOVOSAD, Primary Examiner

U.S. Cl. X.R.

166—274, 275